(12) United States Patent
Janik et al.

(10) Patent No.: US 7,442,292 B2
(45) Date of Patent: Oct. 28, 2008

(54) LIQUID VISUAL DISPLAY

(75) Inventors: Leon P. Janik, Suffield, CT (US); David Ferreira, Glastonbury, CT (US); Michael J. Williams, Glastonbury, CT (US)

(73) Assignee: Stanadyne Corporation, Windsor, CT (US)

( * ) Notice: Subject to any disclaimer, the term of this patent is extended or adjusted under 35 U.S.C. 154(b) by 223 days.

(21) Appl. No.: 11/518,555

(22) Filed: Sep. 8, 2006

(65) Prior Publication Data
US 2007/0068855 A1 Mar. 29, 2007

Related U.S. Application Data

(60) Provisional application No. 60/715,777, filed on Sep. 9, 2005.

(51) Int. Cl.
*B01D 35/143* (2006.01)

(52) U.S. Cl. ............................ 210/90; 210/94; 116/268

(58) Field of Classification Search ................. 210/86, 210/90, 94, 95; 116/228, 268, 276
See application file for complete search history.

(56) References Cited

U.S. PATENT DOCUMENTS

| | | | | |
|---|---|---|---|---|
| 2,661,847 A | * | 12/1953 | Buettner | 210/134 |
| 6,641,742 B2 | * | 11/2003 | Prater et al. | 210/767 |
| 7,182,855 B1 | * | 2/2007 | O'Leary | 210/90 |

* cited by examiner

*Primary Examiner*—Terry K Cecil
(74) *Attorney, Agent, or Firm*—Alix, Yale & Ristas, LLP

(57) ABSTRACT

A display provides an indication of the remaining useful life of a filter element by providing a visible level of fluid in the display corresponding to the remaining useful life. The fluid level is adjusted by a valve responsive to a pressure differential across the filter element. An increasing pressure differential produces an increased fluid level in the display. The display may be provided with markings indicating that a particular fluid level in the display corresponds to the need to change a filter cartridge containing the filter element.

10 Claims, 2 Drawing Sheets

US 7,442,292 B2

LIQUID VISUAL DISPLAY

CROSS REFERENCE TO RELATED APPLICATIONS

This application claims the benefit of U.S. Provisional Application No. 60/715,777, filed Sep. 9, 2005, the contents of which are hereby incorporated by reference.

BACKGROUND OF THE INVENTION

1. Field of the Invention

The present invention relates to fluid systems having a filtration device in which restriction of the filtration device can be determined by measurement of pressure. More specifically, the invention relates to devices for indicating whether a fluid filter requires replacement.

2. Description of the Related Prior Art

Fluid systems requiring filtration apparatus are an integral part of the automotive and heavy equipment industries. Engine systems, hydraulic systems and various other collateral systems require fluids such as air, oil, fuel and coolants to be at least partially contained and directed to their functional end points. For instance, in engine systems utilizing diesel fuel, extremely high-pressure pumps are utilized. These pumps have very close tolerances and may be easily damaged or disabled by particulate laden fuel. In addition, the fuel injectors of these engines are configured to deliver a spray of fuel in a specifically designed pattern. Interference with the passages, orifices or other structures of the injectors may result in a decrease in engine efficiency and/or damage to the engine itself. Most of the above-described fluid systems, including most diesel fuel systems, require at least one filter to be present.

In diesel fuel systems, a primary fuel filter is arranged between the fuel storage compartment and the high-pressure fuel pump. Fuel delivery systems for diesel engines typically include a fuel supply pump for delivery of partially pressurized fuel to the high-pressure pump. These fuel supply pumps can be arranged in the fuel storage compartment or close to the high-pressure pump. When arranged in the fuel storage compartment, the supply pump pressurizes the fuel supply line leading to the high-pressure pump. When arranged close to or as part of the high-pressure pump, the supply pump creates negative pressure in the supply line between the fuel storage compartment and the supply pump.

Depending on such things as preventative maintenance scheduling, fluid quality, operating conditions and the like, filters become restricted or clogged at various rates. Filter occlusion may adversely impact system efficiency and in some cases may damage or destroy system components. In other cases restriction of the filter can result in filter failure which may allow highly contaminated fluid to reach portions of a high pressure pump or fuel injection system, resulting in extremely high repair costs for those devices.

DETAILED DESCRIPTION OF THE PREFERRED EMBODIMENT

Figure 1:
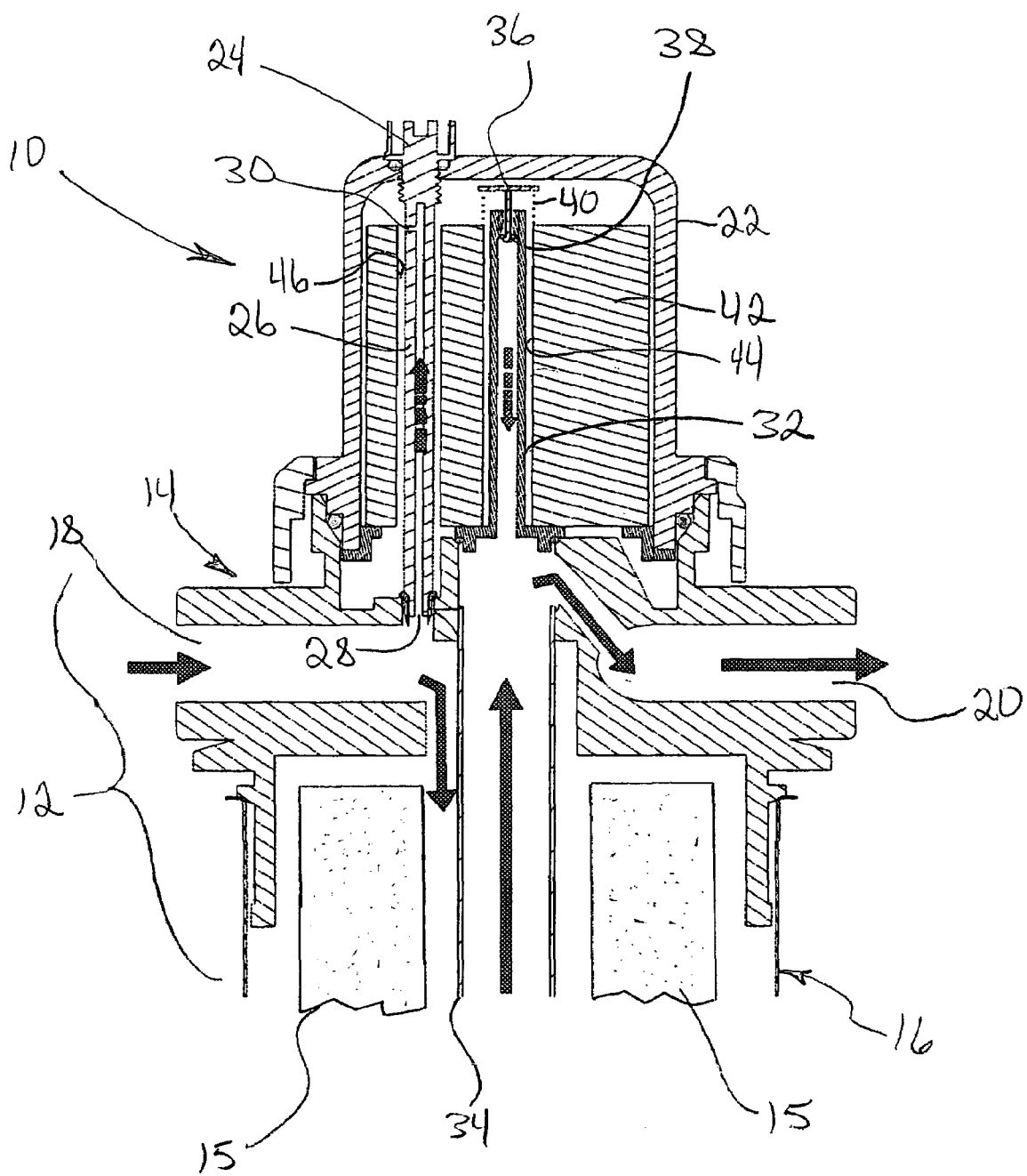
FIG. 1 is a sectional view through an exemplary filter assembly in combination with an exemplary embodiment of a liquid visual display according to aspects of the present invention.

A preferred embodiment of the liquid visual display according to aspects of the present invention will now be described with reference to FIGS. 1-2C wherein like numerals refer to similar parts.

The liquid visual display 10 is configured for attachment to a filter assembly 12. FIGS. 1-2C illustrate the liquid visual display attached to the base 14 of the filter assembly 12. The base 14 is the portion of the filter assembly 12 configured to define a filter receptacle and removably receive a disposable filter cartridge 16. The filter base 14 defines fluid communication pathways 18, 20 from a fuel storage compartment or fuel tank to the filter cartridge 16 and from the filter cartridge 16 toward the high-pressure pump, respectively. The filter base 14 circulates unfiltered fuel through a filter element 15 contained in the received filter cartridge 16 before routing the filtered fuel into the flow pathway 20 toward the high-pressure pump. Together, the filter base 14 and filter cartridge form a filter assembly, the construction and function of which are well known.

The liquid visual display 10 is configured to sense a pressure differential across the filter element 15 and provide a visual indication of that pressure differential in the form of a fluid level visible in a transparent dome 22. According to aspects of the present invention, a low fluid level in the dome 22 corresponds to a low-pressure differential across the filter element, indicating a large proportion of filter life remaining as shown in FIG. 2A. A high level of fuel in the transparent dome 22 is indicative of little or no fuel life remaining and is produced by a corresponding high-pressure differential across the filter element as shown in FIG. 2C.

The variable fluid level in the dome is accomplished by a valve 36, which interacts with a float 42 via a spring 40. As best seen in FIG. 1, the dome 22 is secured to the top or header portion of a filter base 14 in a vertical orientation. An air bleed 24 having an extended stem 26 is threadably engaged through the top of the dome 22 and extends downwardly to sealingly communicate with the fuel inlet passage 18. The stem 26 of the air bleed 24 includes an axial passage 28 and a transverse orifice 30 close to the top of the dome 22. The axial passage 28 and transverse orifice 30 communicate the pressure in the fuel inlet passage 18 with the interior of the dome 22. A valve seat/float guide 32 sealingly engages a fuel outlet conduit 34, which communicates with the fuel outlet passage 20 from the filter. A valve 36 carries a sealing member 38 positioned beneath the valve seat and exposed to the pressure of the fuel outlet passage 20.

Thus, the valve 36 and its sealing member 38 are positioned between the interior of the dome, which is exposed to the fuel inlet pressure and the outlet conduit which is exposed to the fuel outlet pressure. The fuel outlet pressure will always be less than the fuel inlet pressure, with the result that the valve 36 and its sealing member 38 will be exposed to downward force in the illustrated embodiment. The valve 36 is biased toward an upward or sealed position by a spring 40 engaged between a head of the valve and a spring seat molded in a float 42.

The float 42 is configured to substantially fill the interior of the dome 22, thereby minimizing the free volume inside the dome. The float 42 is substantially cylindrical in configuration and includes an axial hole 44 to accommodate the valve seat/float guide 32. The float 42 also includes an off axis hole 46 to accommodate the stem 26 of the air bleed 24, the transverse orifice 30 of the air bleed 24 communicates with the off axis hole 46 in the float 42 which also communicates with the interior of the dome. The buoyancy characteristics of the float 42 and the spring force of the spring 40 are selected so that the valve 36 is pulled away from its sealed position (downwardly in the Figures) when the pressure differential between the inlet passage 18 and outlet passage 20 (across the filter element) reaches a predetermined level.

Unseating the valve 36 allows air to be drawn from the interior of the dome into the fuel outlet passage 20 and permits fluid to be drawn into the dome through the axial passage 28 and transverse orifice 30 of the air bleed 24. Fluid entering the interior of the dome 22 exerts an upward buoyant pressure on the float 42, which increases the upward bias on the valve 36, re-seating the valve. Thus, the float 42, spring 40 and valve 36 interact to provide a variable seating force on the valve 36 in response to the fluid level in the dome. The transverse orifice 30 is positioned such that fluid entering the dome cannot return to the fluid inlet 18. This, the level of fluid in the display reflects a maximum pressure differential across the filter element and not the pressure differential at any given moment in time. It will be apparent to those skilled in the art that the pressure differential across the filter element will vary according to the operating conditions of the system. It is the maximum pressure differential across the filter element that is most relevant to the remaining service life of the element.

As the filter 16 becomes occluded with particulate matter, the pressure differential across the filter element will rise, exerting increasing pressure on the valve 36 and its sealing member 38. An increasing pressure differential will again unseat the valve 36, permitting more fluid to enter the interior of the dome. Higher fluid levels in turn exert a greater buoyant force on the float 42, compressing the spring 40 and increasing the upward sealing force on the valve 36.

Figure 2C:
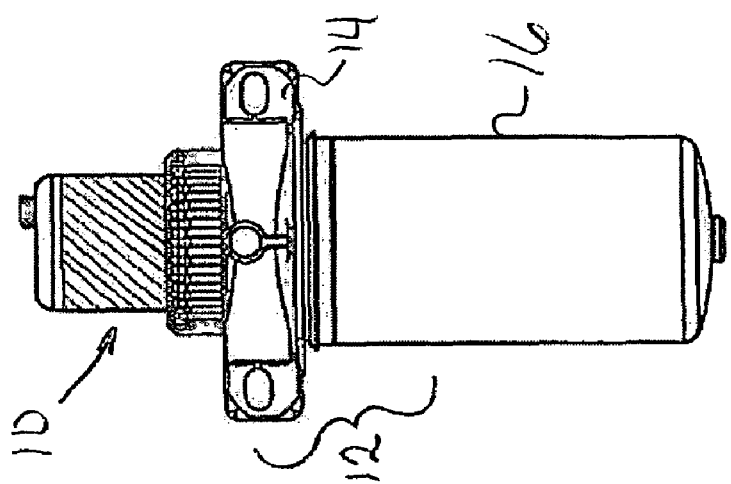
FIGS. 2A through 2C are exterior elevation views of a filter assembly incorporating an exemplary liquid visual display according to aspects of the present invention showing visual indications of filter life by liquid levels in the display.
Figure 2B:
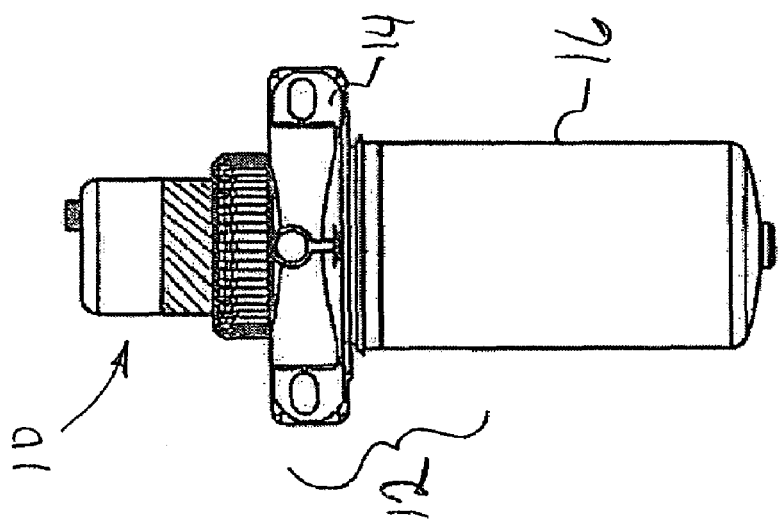
Figure 2A:
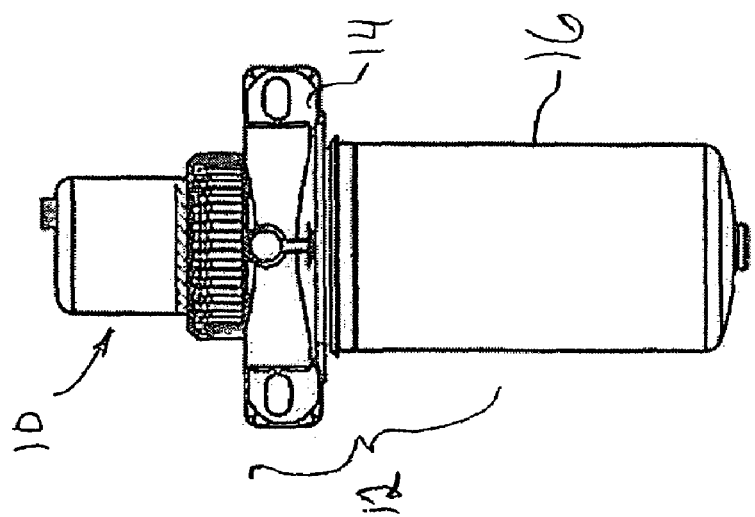

FIGS. 2A-2C illustrate the appearance of the liquid visual display 10 corresponding to various filter conditions. FIG. 2A shows a low level of fluid in the dome, corresponding to a low-pressure differential across the filter element or approximately 100% of filter life remaining. FIG. 2B illustrates an intermediate level of fluid in the dome, indicative of an increased pressure differential across the filter element corresponding to approximately 50% of filter life remaining. FIG. 2C illustrates a high level of fluid in the dome, corresponding to a relatively high-pressure differential across the filter element, indicating little or no filter life remaining. The liquid visual display may be provided with colored bars or other indicia correlating the level of fluid in the dome with the relative filter life or need to change the filter.

The pressure differential corresponding to the fluid level in FIG. 2A is approximately 1-2 inches of mercury. The pressure differential corresponding to the fluid level in FIG. 2C is approximately 7-10 inches of mercury.

An alternative configuration would eliminate the spring between the float and valve so that the valve is biased by the float alone.

The liquid visual display as illustrated in FIGS. 1-2C is configured to function in either a pressurized or vacuum fluid delivery line. A pressurized fluid delivery line is one in which the filter assembly is located between the supply pump and the high-pressure pump. A vacuum or suction fuel supply system is one in which the filter assembly is located between the fuel supply and the supply pump. The liquid visual display is configured to detect a true pressure differential between the fuel inlet and fuel outlet of the filter assembly, since it communicates with both of these pressures.

While a preferred embodiment of the foregoing invention has been set forth for purposes of illustration, the foregoing description should not be deemed a limitation of the invention herein. Accordingly, various modifications, adaptations and alternatives may occur to those skilled in the art without departing from the spirit and the scope of the present invention.

What is claimed is:

1. A display for indicating the pressure differential across a filter element in a filter assembly defining a fluid inlet passage delivering unfiltered fluid to a filter element and a fluid outlet passage for fluid having passed through the filter element, said display comprising:
   a container defining an interior space and through which a level of fluid in said container is visually apparent;
   a first passage communicating between the fuel inlet of the filter assembly and said interior space;
   a second passage communicating between the fuel outlet of the filter assembly and said interior space, said second passage defining a valve seat;
   a valve carrying a sealing member movable between a seated position in which said sealing member is sealingly engaged with said valve seat to interrupt communication between said interior space and said fluid outlet and an unseated position in which said sealing member is moved away from said valve seat permitting communication between said interior space and said fluid outlet;
   a float positioned in said interior space and responsive to a fluid level therein to generate a first biasing force; and
   wherein said first biasing force biases said valve toward said seated position until a pressure differential between said inlet passage and said outlet passage is sufficient to overcome said first biasing force and unseat said valve, permitting fluid from said inlet passage to enter said interior space from said first passage, said fluid acting on said float to increase said first biasing force.

2. The display of claim 1, wherein unseating said valve allows air to pass from said interior space into said fluid outlet, a volume formerly occupied by said air being replaced by fluid entering said interior space.

3. The display of claim 1, comprising a spring compressed between said valve and said float to generate a second biasing force, said first and second biasing forces urging said valve toward said seated position.

4. The display of claim 3, wherein said first biasing force compresses said spring to produce an increased combined biasing force acting on said valve, said combined biasing force increasing as the fluid level in said container increases.

5. The display of claim 1, wherein said container includes visible markings corresponding to fluid levels in said container, said markings indicative of the remaining useful life of a filter element secured to said filter assembly.

6. A filter assembly/display combination comprising:
   a filter assembly defining a fluid pathway extending between a fluid inlet and a fluid outlet and including a filter element for removing particulates and contaminants from said fluid, said filter assembly constructed to permit fluid circulation between said fluid inlet and said fluid outlet only through said filter element; and
   a display for indicating the pressure differential across said filter element, said display comprising:
      a container defining an interior space and through which a level of fluid in said container is visually apparent;
      a first passage communicating between the fuel inlet of the filter assembly and said interior space;
      a second passage communicating between the fuel outlet of the filter assembly and said interior space, said second passage defining a valve seat;
      a valve carrying a sealing member movable between a seated position in which said sealing member is engaged with said valve seat to interrupt communication between said interior space and said fluid outlet and an unseated position in which said sealing member is moved away from said valve seat permitting communication between said interior space and said fluid outlet;

a float positioned in said interior space and responsive to a fluid level therein to generate a first biasing force;

wherein said first biasing force biases said valve toward said seated position until a pressure differential between said inlet passage and said outlet passage is sufficient to overcome said first biasing force and unseat said valve, permitting fluid from said inlet passage to enter said interior space from said first passage, said fluid acting on said float to increase said first biasing force.

7. The display of claim 6, wherein unseating said valve allows air to pass from said interior space into said fluid outlet, a volume formerly occupied by said air being replaced by fluid entering said interior space.

8. The display of claim 6, comprising a spring compressed between said valve and said float to generate a second biasing force, said first and second biasing forces urging said valve toward said seated position.

9. The display of claim 8, wherein said first biasing force compresses said spring to produce an increased combined biasing force acting on said valve, said combined biasing force increasing as the fluid level in said container increases.

10. The display of claim 6, wherein said container includes visible markings corresponding to fluid levels in said container, said markings indicative of the remaining useful life of a filter element secured to said filter assembly.

* * * * *